2 Sheets—Sheet 1.

R. B. PUMPHREY.
MEAT-CUTTERS.

No. 194,370. Patented Aug. 21, 1877.

Witnesses
Inventor

2 Sheets—Sheet 2.
R. B. PUMPHREY.
MEAT-CUTTERS.
No. 194,370. Patented Aug. 21, 1877.
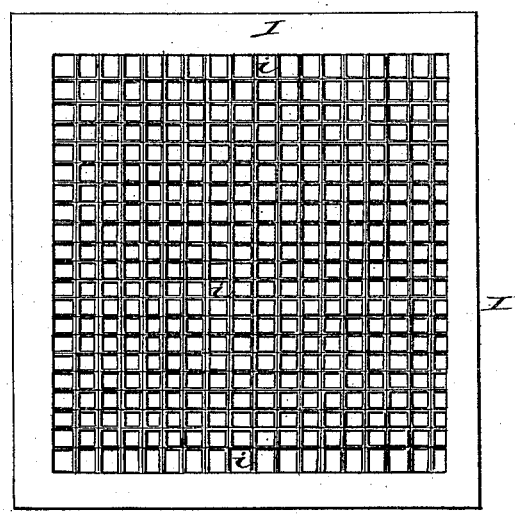
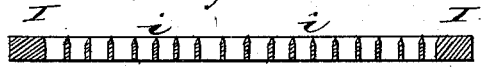
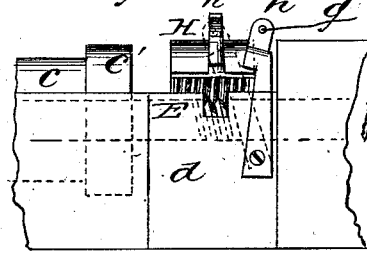
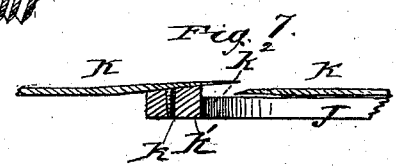
Witnesses
Inventor
Robert B. Pumphrey
Per Edson Bros.
Attorneys

UNITED STATES PATENT OFFICE.

ROBERT B. PUMPHREY, OF BALTIMORE, MARYLAND.

IMPROVEMENT IN MEAT-CUTTERS.

Specification forming part of Letters Patent No. 194,370, dated August 21, 1877; application filed November 11, 1876.

*To all whom it may concern:*

Be it known that I, ROBERT B. PUMPHREY, of Baltimore, in the county of Baltimore and State of Maryland, have invented certain new and useful Improvements in Machine for Chipping Beef and Cutting Fats; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
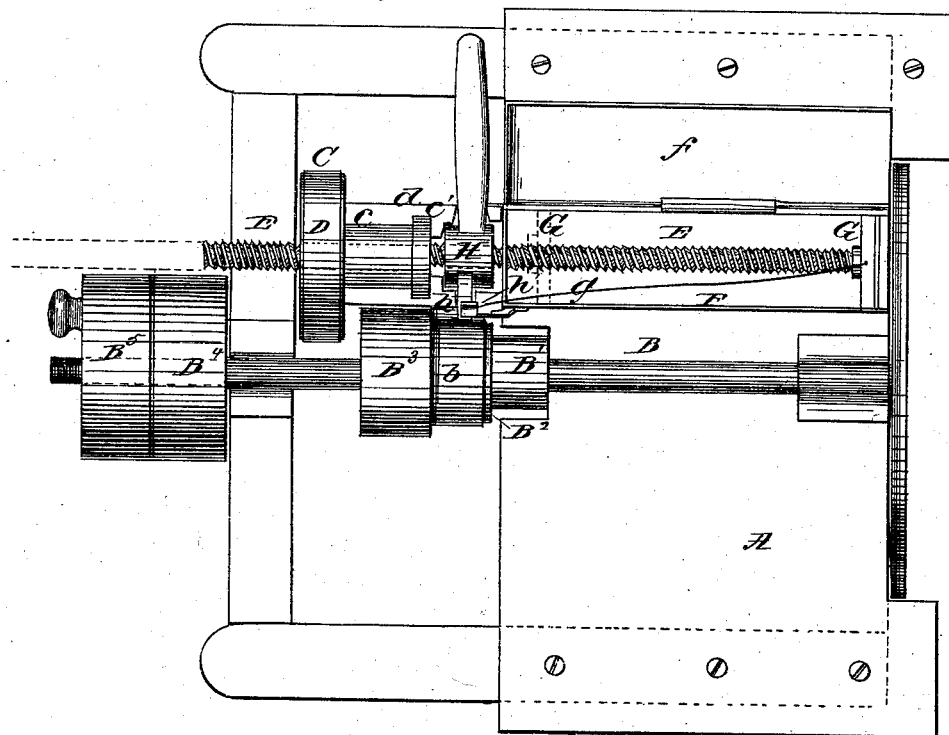
Figure 2:
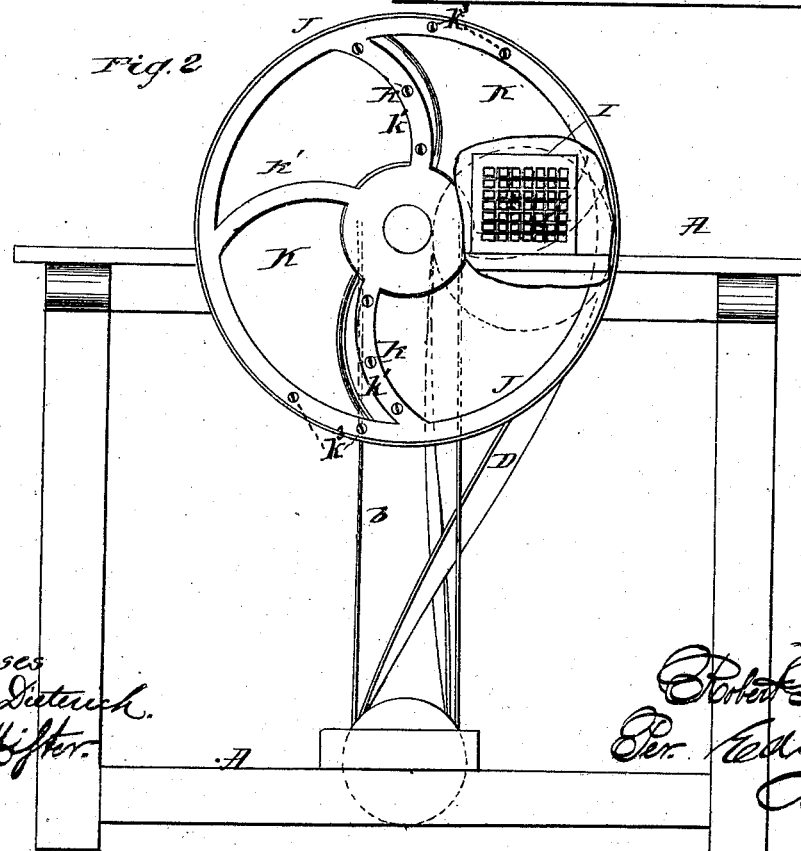

Figure 1, Sheet 1, is a plan of my improved machine for cutting meat. Fig. 2 is a side elevation thereof. Fig. 3, Sheet 2, is an enlarged detached view of the meat-block device. Fig. 4 is a vertical section of the same; and Figs. 5, 6, and 7 are detached views of my machine.

Corresponding parts in the several figures are denoted by similar letters.

This invention relates to a certain improvement in machines for cutting meat of that class in which the meat is fed by a follower to the knives.

It consists, first, of a wheel having its periphery provided with lateral notches or recesses and knives having set-screws; secondly, of means for tripping the follower-operating mechanism; and, thirdly, of a device for blocking the meat, substantially as hereinafter more fully set forth.

In the annexed drawing, A A refer to a frame, upon which is journaled a shaft, B, having a cone of pulleys, $B^1$ $B^2$ $B^3$, and a loose and a fixed pulley, $B^4$ $B^5$, which may be connected with any suitable motor, by a belt or otherwise, to obtain motion. A second shaft, journaled in the lower part of the frame A A, and having a number of pulleys, receives motion from the shaft B through a belt, $b$, which is transmitted to the pulley C, but in a reverse direction, by the cross-belt D. To the pulley C is attached a hollow cylinder or axis, $c$, having its bearing in a boxing, $d$, through which axis and pulley passes a screw, E, extending through and into a box, F, upon the frame A A, and having a plate or follower, G. The axis $c$ is shouldered, as at $c'$, to prevent endwise movement. H is a clamp, fulcrumed in the boxing $d$, and having its curved portion threaded internally to engage the screw E, when it is desired to rotate the latter and impart motion to the follower to feed the meat to the knives, or to the blocking device, to be hereinafter more fully set forth.

The screw E is so attached to the follower as to rotate, and is provided with a longitudinal slot to receive a projection from the pulley $c$, to allow it (the screw) to have endwise movement, in order to impart a like movement to the follower G in feeding the meat to the knives.

A projection, $h$, extending from the clamp H, and over which is hooked a hook, $h'$, attached to the boxing $d$, holds the clamp down upon the screw E. This hook $h'$ is connected to the follower G by a cord or chain, $g$. The hook is automatically released from the projection $h$ by the tightening of the cord or chain $g$, which occurs when the follower G has passed slightly beyond the position it occupies in Fig. 1, or when the box F has been emptied of its contents.

I refers to the "blocking" device, which consists of a reticulated frame, having its dividing-plates or partitions $i$ $i$ $i$ beveled or sharpened, as shown, to perform the cutting of the "fat" or other meat into blocks as it (the meat) is brought up against the same by the follower. After passing through the frame or device I into blocks, the meat is cut or "chipped" by the knives. The blocking device or frame I is attached to that end of the box F contiguous to the knives. The box F is provided with a hinged cover, $f$.

Upon the shaft B is a wheel, J, the periphery of which is provided with lateral notches or recesses $k^2$, and to the sides of the periphery and spokes $k^1$ $k^1$ thereof are attached, by screws $k^3$ $k^3$, two knives, K K, which jointly partake of the shape of a disk, their backs and blades standing contiguous to each other and opposite to the notches or recesses $k^2$. By tightening the screws $k^3$ $k^3$ it will be seen that the blades of the knives are drawn into the notches or recesses $k^2$, separating them laterally (more or less) from their backs, by which the thickness of the chips or pieces of meat being cut will be varied.

The knives, having the shape above described, conform to and cover the entire wheel J, which serves to prevent the falling from the box of any uncut meat, or that failed to pass through or between the knives.

Having thus described my invention, what I claim, and desire to secure by Letters Patent, is—

1. The knives K K, rigidly held to the wheel J, and having set-screws $k^3 k^3$, in combination with said wheel, having lateral notches or recesses $k^2$, substantially as and for the purpose set forth.

2. The tripping or releasing mechanism $g$ $h$ $h'$ and clamp H, in combination with the follower G and receptacle F, substantially as and for the purpose set forth.

3. In a meat-cutting machine, the blocking device or reticulated frame I, having its partitions or dividing-plates $i$ $i$ beveled or sharpened, substantially as and for the purpose set forth.

In testimony that I claim the foregoing as my own I affix my signature in presence of two witnesses.

ROBERT B. PUMPHREY.

Witnesses:
J. WM. MISTER,
M. P. CALLAN.